United States Patent [19]

Ward

[11] 3,895,029
[45] July 15, 1975

[54] FLUOROPOLYMER COATING COMPOSITIONS

[75] Inventor: Richard Bernard Ward, Kennett Square, Pa.

[73] Assignee: E. I. du Pont de Nemours & Co., Wilmington, Del.

[22] Filed: Feb. 13, 1974

[21] Appl. No.: 442,169

[52] U.S. Cl..... 260/31.4 R; 260/32.8 R; 260/42.27; 260/900
[51] Int. Cl. ... C08f 29/22; C08f 45/04; C08f 45/34; C08f 45/42
[58] Field of Search............ 260/42.27, 900, 32.8 R, 260/31.4 R; 106/304

[56] References Cited
UNITED STATES PATENTS

| | | | |
|---|---|---|---|
| 2,311,613 | 2/1943 | Slayter | 260/39 R |
| 2,357,096 | 8/1944 | Fireman | 106/304 |
| 2,558,302 | 6/1951 | Marcot | 106/304 |
| 2,643,982 | 6/1953 | Riley | 260/32.8 R |
| 3,298,959 | 1/1967 | Marks et al. | 252/300 |
| 3,318,850 | 5/1967 | Stilmar | 260/78.5 |
| 3,324,069 | 6/1967 | Koblitz | 260/900 |
| 3,340,222 | 9/1967 | Fang | 260/42.27 |
| 3,429,844 | 2/1969 | Neros | 260/42.27 |
| 3,449,305 | 6/1969 | Stilmar | 260/42.27 |
| 3,454,517 | 7/1969 | Neros | 260/42.27 |
| 3,459,834 | 8/1969 | Schmitt | 260/900 |
| 3,498,939 | 3/1970 | Schier | 260/42.27 |
| 3,524,906 | 8/1970 | Schmitt | 260/900 |
| 3,531,441 | 9/1970 | Stilmar | 260/78.5 |
| 3,556,923 | 1/1971 | Polejes | 260/42.27 |
| 3,779,976 | 12/1973 | Marsico | 260/900 |

*Primary Examiner*—Allan Lieberman

[57] ABSTRACT

Coating compositions of fluoropolymer based on vinyl fluoride or vinylidene fluoride and finely divided ferric oxide, optionally containing acrylic polymer. The compositions provide clear coatings of excellent durability on ultraviolet light sensitive substrates.

6 Claims, No Drawings

FLUOROPOLYMER COATING COMPOSITIONS

BACKGROUND OF THE INVENTION

Surface coatings are applied to substrates to provide enhancement of aesthetics as well as protection of the substrate surface. Such coatings may be opaque and highly pigmented or transparent lacquers and varnishes with little or no pigment. While clear coatings are applied to many types of surfaces to provide protection, such coatings are advantageously used on wood or cellulosic surfaces so that in addition to the protection provided, the natural beauty of the material is enhanced. One of the problems associated with the use of clear coatings derived from compositions such as acrylic resins, alkyds and the like on wood surfaces is the lack of durability particularly when coatings are exposed to sunlight.

Clear coating compositions containing polymers prepared from fluorine-containing monomers are known to have good long-term weatherability. The use of fluorine-containing polymers as clear coatings became more practical with the recent development of fluoropolymers which are soluble in common solvents, which coalesce to continuous films upon air drying at ambient temperatures and which exhibit good adhesion to surfaces. Although fluoropolymer clear coating compositions provide weatherability many times better than that provided by conventional clear coatings, they have not provided long-term weatherability on wood and other ultraviolet light degradable surfaces commensurate with the inherent stabilities of the fluoropolymer coatings themselves. One possible reason for failure is that ultraviolet light induces degradation of the substrate surface at the fluoropolymer-substrate interface. Such surface degradation results in loss of adhesion of the fluoropolymer coating such that in many cases still-intact films of fluoropolymer coatings are delaminated. Attempts to use conventional ultraviolet absorbers in fluoropolymer coatings did not increase weatherability appreciably because the conventional ultraviolet absorbers are generally not compatible with fluoropolymers and are not as photostable as the fluoropolymers.

SUMMARY OF THE INVENTION

The present invention provides durable clear fluoropolymer coating compositions having long-term weatherability on ultraviolet light sensitive substrates.

Specifically, there is provided a composition comprising consisting essentially of
 a. a film-forming fluoro-polymer having a molecular weight of about from 3,000 to 1,000,000 and prepared from
  1. at least one polymerizable fluoroolefin of the formula $CH_2=CFX$ wherein X is hydrogen or fluorine,
  2. up to 0.5 mole per mole of the fluoroolefin, of tetrafluoroethylene; and
  3. up to 0.3 mole, per mole of the fluoroolefin, of an olefin of the formula $CH_2=CAB$ wherein A is hydrogen or alkyl having 1 or 2 carbon atoms, and B is selected from

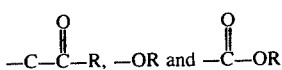

where R is alkyl of 1 to 8 carbon atoms,
 b. about from 1 percent to 20 percent by weight of ferric oxide of about from 25 to 100 m$\mu$. particle size and substantially free from surfactant selected from alkyl and alkyl-aryl sulfonates, and
 c. up to 50 percent by weight of the fluoropolymer of a normally solid acrylic polymer selected from polymers and copolymers of alkyl acrylate and alkyl methacrylate.

DETAILED DESCRIPTION OF THE INVENTION

Fluoropolymers used in the present invention contain at least one fluorine-containing polymerizable monomer in a polymerized form. The fluoropolymers are normally solid polymers of sufficiently high molecular weights to be useful in coating compositions and thus have molecular weights in the range of about from 3,000 to 1,000,000. Representative fluoropolymers include polyvinyl fluoride, polyvinylidene fluoride; copolymers of vinyl fluoride and tetrafluoroethylene; copolymers of vinyl fluoride and vinylidene fluoride; copolymers of vinylidene fluoride and tetrafluoroethylene; copolymers of vinyl fluoride, tetrafluoroethylene, and alkyl acrylate; copolymers of vinyl fluoride, tetrafluoroethylene and alkyl methacrylate; copolymers of vinyl fluoride, tetrafluoroethylene and vinyl carboxylate; copolymers of vinyl fluoride, tetrafluoroethylene, and vinyl alkyl ether; copolymers of vinylidene fluoride, tetrafluoroethylene, and alkyl acrylate; copolymers of vinylidene fluoride, tetrafluoroethylene, and alkyl methacrylate; copolymers of vinylidene fluoride, tetrafluoroethylene, and vinyl carboxylate and copolymer of vinylidene fluoride, tetrafluoroethylene, and vinyl alkyl ether wherein the alkyl and the carboxylate groups are as defined.

The preferred fluoropolymers as used in the compositions of the invention are those described in U.S. Pat. Nos. 3,318,850; 3,449,305 and 3,531,441, because of the high degree of solubility of those polymers in inexpensive solvents, their ability to coalesce from solutions in common solvents to continuous films at ambient temperatures, good adhesion to surfaces, good stability and ease of application and formulation by the usual techniques of the coating industry.

An especially desirable fluoropolymer is polymerized from at least one fluoroolefin of the formula $CH_2=CFX$ wherein X is hydrogen or fluorine; up to 0.5 mole, per mole of the fluoroolefin, of tetrafluoroethylene; and up to 0.3 mole, per mole of the fluoroolefin, of olefin of the formula $CH_2=CAB$ wherein A is hydrogen or alkyl having one or two carbon atoms, and B is selected from

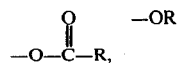

and

wherein R is alkyl of 1–8 carbon atoms.

The fluoropolymer coating composition can contain up to about 50 percent of the weight of the fluoropolymer of a normally solid acrylic polymer. The acrylic polymer can be alkyl acrylate homopolymer and alkyl methacrylate homopolymer wherein the alkyl group is a $C_1$ to $C_8$ alkyl group or can be a copolymer wherein a mixture of alkyl group is used or a copolymer wherein the alkyl acrylate and methacrylate is copolymerized with acrylic and methacrylic acid. The acrylic polymer preferably contains at least about 75 percent by weight of methyl methacrylate and up to 25 percent by weight of comonomer. The incorporation of acrylic polymer in the fluoropolymer imparts greater hardness and in certain cases, provides coatings of greater clarity. Amounts of acrylic polymer greater than about 50 percent by weight of the fluoropolymer can depreciate the inherent stability and weatherability of the fluoropolymer.

In the incorporation of ferric oxide into the present coating compositions, both red ferric oxide and yellow ferric oxide can be used. For use in the present clear fluoropolymer coatings, the particle size must be very small. It has been found that iron oxide particles of about from 25 to 100 millimicron m$\mu$.) provide satisfactory optical clarity. Particle sizes in excess of 100 m$\mu$. will depreciate the optical clarity of the coatings.

The amount of ferric oxide used in the present coatings is about from 1 percent to 5 percent by weight for red ferric oxide and about from 1 percent to 20 percent by weight for yellow ferric oxide, all based on the total weight of fluoropolymer and acrylic resin, the concentration depending upon the thickness of the clear coating desired. Since clear coatings are generally used in thickness of from about 1 mil to 6 mils, it is convenient to express the coating concentration of ferric oxide in terms of mil percent wherein mil percent is a product of coating thickness in mils and the concentration of ferric oxide in weight percent. Thus when the coating thickness is 2 mils and the ferric oxide concentration is 2 percent by weight, such coating will have a coating concentration of 4 mil percent. Generally, in order to provide sufficient protection coating concentration of about 1 mil percent is required. Coating concentrations of greater than about 5 mil percent for red ferric oxide and 20 mil percent for yellow ferric oxide will be too intensely colored for a clear coating. In the above coating concentration ranges, the clear coatings will have aesthetically pleasing coloration which enhances the appearance of the substrate, such as the natural grain structure of the wood surface. A mixture of red and yellow ferric oxide can be used to obtain intermediate colorations.

Finely divided iron oxides are commercially available. However, many of these are compounded with alkyl-sulfonate or alkyl-aryl sulfonate surfactants to facilitate dispersion of the iron oxide in various media. Iron oxide compositions containing these and similar organic surfactants are of limited utility in the present invention. When a clear fluoropolymer coating containing ferric oxide and a surfactant is subjected to weathering, discoloration in the coating composition takes place as indicated by a progressive darkening of the coating. This discoloration is distinguished from the usual degradation of the cellulosic surface which is indicated by the graying at the interface. Accordingly, ferric oxides used in the present invention should be substantially free of surfactants of this type.

Dispersions are also available wherein ferric oxide is stably dispersed by the use of acrylic resins. Such dispersions are suitable for use in the present invention and the acrylic resin present therein may constitute a part or the total amount of the acrylic resin in the fluoropolymer coating composition. Commercially available ferric oxide dispersions which have been found to be particularly satisfactory in the present invention include a red ferric oxide and acrylic resin in mixed solvents available as Red Shade Midas Gold 997-X-294; yellow ferric oxide and acrylic resin in mixed solvents available as Yellow Shade Midas Gold 997-X-295; red ferric oxide and acrylic resin in mixed solvents available as Red Shade Midas Gold 2581; yellow ferric oxide and acrylic resin in mixed solvents available as Yellow Shade Midas Gold 2582; and red ferric oxide in toluene available as Midas Gold 6289 all from Inmont Corp., RBH Dispersions Div., Bound Brook, N.J., as well as red ferric oxide and acrylic resin in mixed solvents available as Flushed Ferric Hydrate FS-1245 from Chemetron Corp., Pigments Div., Holland, Michigan.

Known methods can be used to make the present coatings. For those fluoropolymers which are not soluble in common solvents at ordinary temperatures such as poly(vinylfluoride), poly(vinylidene fluoride) and copolymers of vinyl fluoride and of vinylidene fluoride which contain very high proportions of vinyl fluoride or vinylidene fluoride, dispersions of these fluoropolymers in latent solvents are used. Latent solvents are those organic liquids which have no appreciable solvency for the fluoropolymers at ordinary temperatures but are solvents for the polymers at elevated temperatures. Such latent solvents include, for example, acetone, methylethyl ketone, dibutyl ketone, ethylamyl ketone, cyclohexanone, isophorone, diacetone alcohol, mesityl oxide, 4-methoxy-4-methylpentanone-2, dimethylformamide, tetramethylene sulfone, nitroparaffins, methylbenzoate, ethylene carbonate, propylene carbonate, N,N-dimethylacetamide, N-methylacetamide, beta-propolactone, delta-valerolactone and the like. Ferric oxide of suitable size is intimately mixed with a dispersion of the fluoropolymer in a latent solvent, with or without acrylic resin, such as in a ball mill. Generally the acrylic resins, when used, are soluble in the above latent solvents and thus the composition will be essentially dispersions of fluoropolymer and ferric oxide in a latent solvent having acrylic resin dissolved therein. The above dispersion can be used to coat a substrate in any of the well known processes such as brushing, spraying or dipping. The coated substrate is then baked to obtain clear coalesced fluoropolymer coating.

The preferred fluoropolymers, being soluble in common organic solvents, can also be applied with a solvent. A preferred method of application involves a preparation of ferric oxide dispersion in a fluoropolymer and acrylic resin solution in solvents such as cyclohexanone, methylethyl ketone, dimethylacetamide, tetrahydrofuran, nitroethane, 4-methoxy-4-methylpentanone-2, 2-ethoxyethyl acetate or mixed solvents such as xylene/nitroethane/ethylacetate, and nitroethane/toluene. The preparation of the ferric oxide dispersion in the polymer solution may be facilitated by ball milling. The ferric oxide dispersion obtained, particularly when acrylic resins are also used, are stable dispersions because of the stabilization effects of the dissolved polymers. The dispersion can then be applied by brushing, spraying or dipping to the substrate and upon evaporation of the solvent a continuous coalesced coating is obtained which is durable and weather resistant.

The coating thickness on the substrate can be adjusted by the control of the concentration of the polymers in solution and the amount of solution applied. Coatings of 1–2 mil thickness have been found suitable as protective coatings for most substrates. 10 to 25 percent by weight of fluoropolymer in a solvent or a mixture of solvents have been found particularly useful but a wide range of other concentrations can be used.

A typical liquid composition for coating application will contain from about 10 percent to 25 percent by weight of the preferred fluoropolymer, 0 to about 12.5 percent by weight of acrylic resin, about 0.1 percent to 1.87 percent by weight of red ferric oxide or about 0.1 to 7.5 percent by weight of yellow ferric oxide and from about 60 percent to 90 percent by weight of a solvent or solvent mixture. A preferred liquid composition will contain from 15 percent to 20 percent by weight of the preferred fluoropolymer, 4.5 percent to 6 percent by weight of acrylic resin, 0.15 percent to 1.0 percent by weight of red ferric oxide or 0.15 percent to 4.0 percent by weight of yellow ferric oxide and 69 percent to 80 percent by weight of a solvent or solvent mixture. The preferred solvents are 4-methoxy-4-methylpentanone-2 and 2-ethoxyethyl acetate and the preferred solvent mixture is a mixture of from about 10 percent to 90 percent by weight of 4-methoxy-4-methylpentanone-2 and 10 percent to 90 percent by weight of 2-ethoxyethyl acetate.

The coating compositions can be used on a number of different substrates including ferrous metals such as iron and steel, ferrous alloys such as stainless steel, nonferrous metals such as aluminum, zinc, copper and the like, wood of all types including hardboard, cellulosic products such as paper and on materials of construction such as concrete, brick, asphalt, plastics, etc. Over cellulosic substrates, the clear formulations may be applied directly to the substrate although it is preferable to coat the substrate with a clear primer such as well known commercial clear acrylic emulsion primers. After drying of the primer coating, the fluoropolymer coating is applied over the primer. The primer coating, by sealing the cellulosic surface, conserves the use of fluoropolymer and also affords a more uniform surface for better adhesion and smoother finish of the fluoropolymer coating.

EXAMPLES 1–3

A vinylidene fluoride copolymer containing, by weight, 70 percent vinylidene fluoride, 20 percent tetrafluoroethylene and 10 percent vinyl butyrate was prepared according to Example 1 of U.S. Pat. No. 3,449,305.

A lacquer containing fluoropolymer was prepared having the following composition.

| Component | g. |
|---|---|
| Red Shade Midas Gold 997-X-294[1] | 3.56 |
| 4-methoxy-4-methylpentanone-2 | 66.85 |
| fluoropolymer[2] | 18.7 |
| Component | g. |
| "Elvacite" 6012 acrylic resin solution[3] | 9.8 |
| benzophenone | 1.19 |

-Continued

| Component | g. |
|---|---|

[1]Pigment having 20% red ferric oxide, 30% acrylic resin, and 50% mixed solvents, commercially available from Inmont Corp.
[2]Prepared from vinylidene fluoride (70)/tetrafluoromethylene (20)/vinyl butyrate (10)
[3]Methyl methacrylate resin (40%) in mixed solvents commercially available from E. I. du Pont de Nemours and Co.

To the Midas Gold dispersion, 4-methoxy-4-methylpentanone-2 solvent was slowly added with constant stirring. Solid fluoropolymer was added and the mixture was gently stirred for about 12 hours until the polymer had dissolved. The solution of the fluoropolymer was accelerated by warming the mixture to 30°–40°C. After the fluoropolymer was completely dissolved, the acrylic resin solution was added with stirring. Benzophenone, an optional component which brings about cross-linking of the fluoropolymer upon exposure to ultraviolet light, was also added. The lacquer composition prepared as above had 3 percent red ferric oxide based on the total resin weight, 18.7 percent fluoropolymer, 5 percent acrylic resin (total) and a ratio of fluoropolymer to acrylic resin of 79:21 and 5 percent benzophenone.

Wood panels of redwood, pine and fir plywood (2½ inch × 3½ inch) were sanded and prime coated with aqueous acrylic emulsion primer containing 0.15 percent organic mercurial antifungal agent. The clear primer coatings were of 1.5 to 2 mils thickness. After the primer coating was dry, fluoropolymer clear coating was applied by brush coating. The dry fluoropolymer coatings were of 2–3 mils thickness. The coated panels were then protected on the back and along the sides with aluminum paint. In order to nullify the effects on weatherability of microscopic coating defects which can bring about rapid deterioration, a 0.5 inch X-cut was made on the bottom of each panel, the X-cut being cut into the wood. It was felt that the X-cut permitted measurements of "cutdamage resistance" and that such panels were more reliable measure of actual field durability. The coated panels all showed excellent clarity, transparency and gloss.

The coated panels were exposed (1) in a weathering device (Atlas Weather-Ometer Model XW, Atlas Electrical Device Co., Chicago, Ill.) wherein the test panels were continuously subjected to light of carbon arc passed through Corex D glass filters and for 18 minutes of every 2 hours, were subjected to a spray of distilled water and (2) the outdoor atmosphere on a chemical plant, the panels being placed at 45° angle facing south.

In Examples 2 and 3, the above experimental procedure was repeated, using 3 percent red ferric oxide and 3 percent yellow ferric oxide, both without benzophenone, in Examples 2 and 3, respectively.

In control Examples A-G, the general procedure of Example 1 was repeated, using no additive to the fluoropolymer, different ultraviolet absorbing compounds, or ferric oxides with surfactant.

The results of the exposure after some 5200 hours in the weathering device and 22 months outdoors are summarized in the Table below. The coatings were considered to have failed when the coatings disintegrated, became greatly discolored or became delaminated.

TABLE

| Example | Coating | Weathering Device Exposure (to 5228 Hrs.) | Outdoor Exposure |
|---|---|---|---|
| 1 | Fluoropolymer + 3% red ferric oxide + 5% benzophenone | All panels excellent. Very slight stain on redwood and plywood. | All panels excellent at 22 months. Very slight stain at X-cut. |
| 2 | Fluoropolymer + 3% red ferric oxide[1] | Pine — excellent; Redwood, Plywood — very slight stain | All panels excellent at 22 months. Very slight stain at X-cut. |
| 3 | Fluoropolymer + 3% yellow ferric oxide[2] | All panels excellent. Very slight deterioration at X-cut. | All panels excellent at 22 months. Very slight stain at X-cut. |
| Control | | | |
| A | Fluoropolymer (no additive) | Redwood failed at 3054 hrs. Pine failed at 3844 hrs. Plywood — extensive staining | All show staining and failure at X-cut at 15 months. |
| B | Fluoropolymer on wood surface impregnated with ferric oxide | Pine failed at 3054 hrs. Redwood and plywood show staining over most of panel. | All show severe staining and failure at X-cut at 15 months. |
| C | Fluoropolymer + "Cyasorb" UV-24[3] (4%) | Plywood failed at 3844 hrs. Pine failed at 5288 hrs. Redwood failed at 5288 hrs. | All show staining and failure at X-cut at 15 months. |
| D | Fluoropolymer + 3% "Cyasorb" UV-24 + 1.5% "Rylex" NBC[4] | Plywood, Redwood, Pine — failed at 5288 hrs. | All show staining and failure at X-cut at 15 months. |
| E | Fluoropolymer + 5% ferric pyrophosphate | Pine failed at 3054 hrs. Redwood failed at 5228 hrs. Plywood failed at 5228 hrs. | All show staining and failure at X-cut at 15 months. |
| F | Fluoropolymer + 4% "Uvinul" D-49[5] | Pine, Plywood, Redwood — failed at 5228 hrs. | All show severe staining and failure at X-cut at 15 months. |
| G | Fluoropolymer + 5% ferric oxide with alkyl and alkyl-aryl sulfonate surfactant | Dark and opacified. | Dark and opacified at 15 months. |

[1] Red ferric oxide, Red Shade Midas Gold 997-X-294, commercially available from Inmont Corp.
[2] Yellow ferric oxide, Yellow Shade Midas Gold 997-X-295, commercially available from Inmont Corp.
[3] "Cyasorb" UV-24 — 2,2'-dihydroxy-4-methoxybenzophenone, commercially available from American Cyanamid.
[4] "Rylex" NBC — nickel dibutyldithiocarbamate, commercially available from E. I. du Pont de Nemours and Co.
[5] "Uvinul" D-49 — 2,2'-dihydroxy-4,4'-dimethoxybenzophenone, commercially available from GAF Corp.

I claim:

1. An optically clear coating composition consisting essentially of
   a. a film-forming fluoropolymer having a molecular weight of about from 3,000 to 1,000,000 and prepared from
      1. at least one polymerizable fluoroolefin of the formula $CH_2=CFX$ wherein X is hydrogen or fluorine,
      2. up to 0.5 mole per mole of the fluoroolefin, of tetrafluoroethylene; and
      3. up to 0.3 mole, per mole of the fluoroolefin, of an olefin of the formula $CH_2=CAB$ wherein A is hydrogen or alkyl having 1 or 2 carbon atoms, and B is selected from

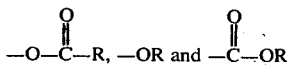

where R is alkyl of 1 to 8 carbon atoms,
   b. about from 1 percent to 20 percent by weight of ferric oxide of about from 25 to 100 m$\mu$. particle size and substantially free from surfactant selected from alkyl and alkyl-aryl sulfonates, and
   c. up to 50 percent by weight of the fluoropolymer of a normally solid acrylic polymer selected from polymers and copolymers of alkyl acrylate and alkyl methacrylate.

2. A coating composition of claim 1 wherein the ferric oxide is red ferric oxide and is present in a concentration of about from 1 to 5 weight percent.

3. A coating composition of claim 1 comprising about from 5 to 50 weight percent of acrylic polymer containing at least about 75 percent by weight of methyl methacrylate and up to 25 percent by weight of comonomer.

4. A liquid coating composition consisting essentially of about from 10 percent to 40 percent of the composition of claim 1 and about from 60 percent to 90 percent of at least one solvent.

5. A liquid coating composition of claim 4 wherein the solvent is selected from at least one of 4-methoxy-4-methylpentanone-2 and 2-ethoxyethyl acetate.

6. A liquid coating composition of claim 5 wherein the solvent consists essentially of about from 10 percent to 90 percent by weight of 4-methoxy-4-methylpentanone-2 and about from 10 percent to 90 percent by weight of 2-ethoxyethyl acetate.

* * * * *